United States Patent [19]
Jasgur

[11] 3,711,182
[45] Jan. 16, 1973

[54] GLARELESS MIRROR USING RELATIVELY ROTATABLE POLARIZERS

[76] Inventor: Joseph Jasgur, 7673 Melrose Avenue, Los Angeles, Calif. 90046

[22] Filed: May 17, 1971

[21] Appl. No.: 143,994

[52] U.S. Cl. ..............350/159, 350/96 B, 350/156, 350/243
[51] Int. Cl. .................................................G02b 5/30
[58] Field of Search......350/147, 152, 156, 157, 159, 350/96 B, 243, 305

[56] References Cited

UNITED STATES PATENTS

| | | | |
|---|---|---|---|
| 2,466,625 | 4/1949 | Ulmer | 350/159 |
| 2,776,598 | 1/1957 | Dreyer | 350/147 |
| 2,882,631 | 4/1959 | Boone | 350/157 |
| 2,943,184 | 6/1960 | Christopherson | 350/305 |
| 2,096,696 | 10/1937 | Land | 350/156 |
| 3,590,232 | 6/1971 | Sadowski | 350/96 B |
| 3,567,309 | 2/1971 | Jasgur | 350/156 |

*Primary Examiner*—David Schonberg
*Assistant Examiner*—Paul R. Miller
*Attorney*—Pastoriza & Kelly

[57] ABSTRACT

A mirror having a polarized surface cooperates with a light source for illuminating a subject in front of the mirror. A polarized window in front of the light source is provided so that the illuminating light on the subject is also polarized and the relative directions of polarization of the window and mirror can be adjusted to bring out highlights when a subject is viewed in the mirror.

5 Claims, 5 Drawing Figures

PATENTED JAN 16 1973
3,711,182
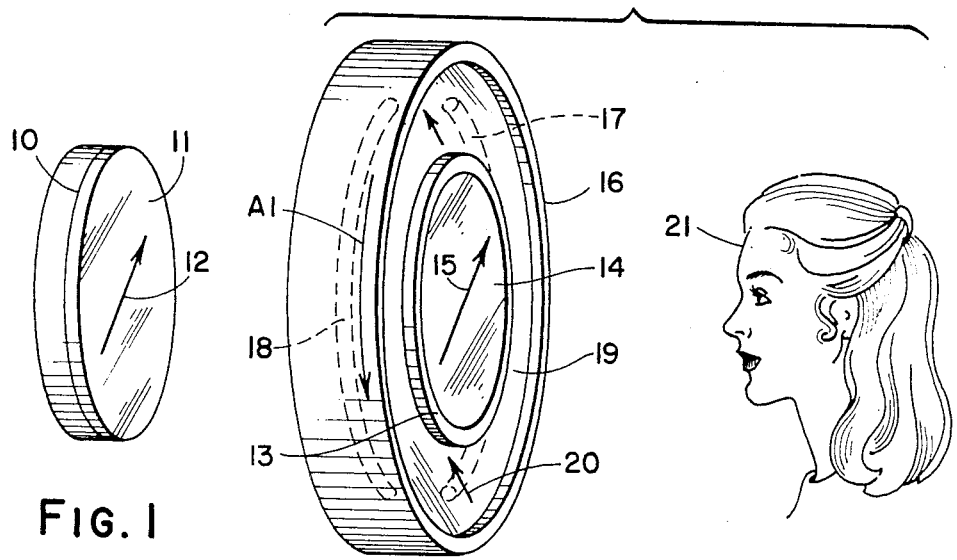
FIG. 1
FIG. 2
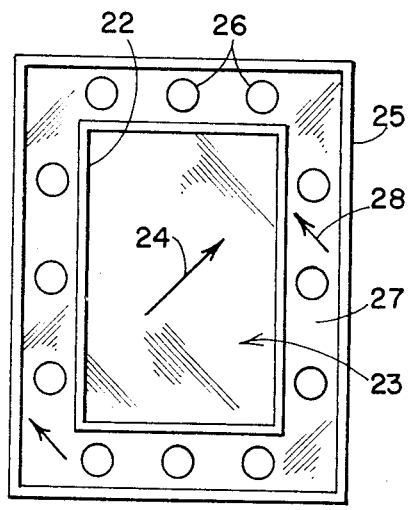
FIG. 3
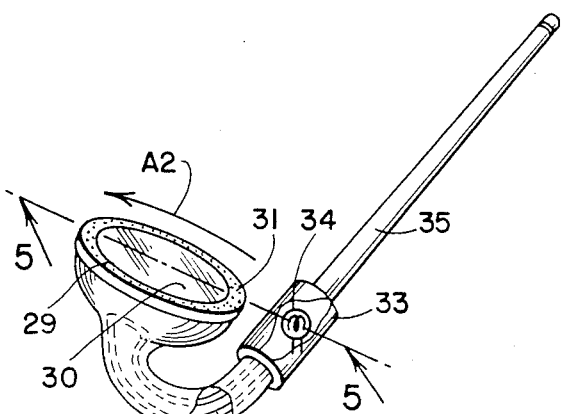
FIG. 4
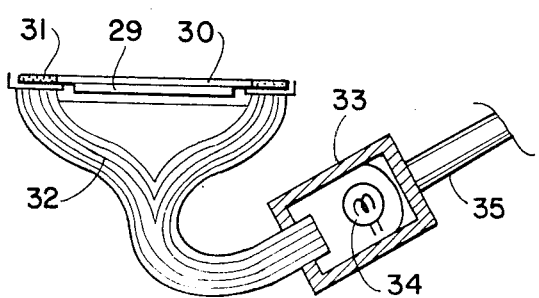
FIG. 5
INVENTOR.
JOSEPH JASGUR
BY Pastoriza & Kelly
ATTORNEYS

GLARELESS MIRROR USING RELATIVELY ROTATABLE POLARIZERS

This invention relates to polarizing techniques and more particularly to a novel polarized mirror.

BACKGROUND OF THE INVENTION

Polarized glass and even polarized lens are well known in the art. Generally the polarization of a glass or lens helps to cut down glare when objects are viewed through the glass or lens. The reason for elimination of certain glare is the fact that light reflected from various surfaces is partially polarized and by adjusting the direction of polarization of the reflected light from the surface and the direction of polarization of the glass or lens, such glare can be substantially attenuated.

In spite of the extensive work with respect to polarizing light, to my knowledge no one has yet conceived of a polarized mirror surface and it is towards this concept that the present invention is directed.

BRIEF DESCRIPTION OF THE PRESENT INVENTION

In accord with the present invention, there is provided a mirror having a polarized surface. With this arrangement, viewing an object with the mirror will in effect enable elimination of glare since the object being viewed in turn reflects light which can be partially polarized.

In accord with the preferred embodiment of the invention there is provided in combination with the polarized mirror a light source for emitting light to a subject to be viewed in the mirror. The light from this source is also polarized but the polarization direction is different from that of the mirror. By mounting the light source and mirror in such a manner that relative rotation can take place, a very careful control of glare and the like from the subject when viewed in the mirror can be realized.

A particularly useful embodiment constitutes a dentist's mirror utilized for viewing tissue in the mouth. In this instance, moisture and the like tend to produce glare spots but when the mirror and light source of the present invention are utilized, such glare from moist areas can be substantially eliminated.

BRIEF DESCRIPTION OF THE DRAWINGS

A better understanding of the invention will be had by referring to the accompanying drawings, in which:

FIG. 1 is a perspective view of a mirror in accord with the invention;

FIG. 2 is another perspective view of a combination mirror and light source showing a subject viewing herself in the mirror;

FIG. 3 is a front elevational view of a mirror and light source means in accord with a modified embodiment of the invention;

FIG. 4 is a perspective view of a hand-held type mirror such as might be used by a dentist incorporating a light source in accord with the invention; and, FIG. 5 is a fragmentary cross section taken in the direction of the arrows 5—5 of FIG. 4.

DETAILED DESCRIPTION OF THE INVENTION

Referring to FIG. 1 there is shown a mirror 10 having a polarized surface 11. The direction of polarization is indicated by the arrow 12.

The simple mirror with the polarized surface a illustrated in FIG. 1 has many useful applications. For example, it could be utilized as the rear view mirror in an automobile thereby cutting down glare reflected from streets and the like when viewed through the mirror.

Referring now to FIG. 2 there is shown a first preferred form of the invention comprising a mirror 13 having a polarizing surface 14 linearly polarizing the mirror in a first direction as indicated by the arrow 15. An annular light source means is mounted as by means of a casing 16 to the mirror 13. This light source means includes an annular light source which may be made up of curved fluorescent tubes 17 and 18 indicated in dotted lines. An annular window 19 in turn is disposed in front of the light sources in a position substantially co-planar with the surface of the mirror 13. The window 19 is polarized in a second direction as indicated by the arrow 20.

With the foregoing arrangement, a subject such as a girl 21 viewing herself in the mirror 13 will be illuminated by polarized light from the annular light source. This polarized light in turn will be reflected into the mirror 13 and because of the polarization of the mirror itself as by the surface 14, certain glary portions will be attenuated. The degree of attenuation can be carefully controlled by rotating the casing and annular window 19 relative to the mirror 13, such relative rotation being indicated by the arrow A1.

The mirror structure of FIG. 2 is ideal as a cosmetic mirror for applying makeup and the like.

FIG. 3 illustrates a mirror and light source structure similar to FIG. 2 but in the more conventional shape of a cosmetic mirror. As shown, there is provided a mirror 22 of rectangular shape having a polarizing surface 23 for polarizing light impinging upon the mirror in the direction of the arrow 24.

A light source means surrounding the mirror includes a casing 25 within which are incorporated a series of light bulbs 26. A window 27 in turn is disposed in front of the light bulbs and is preferably co-planar with the surface of the mirror 22. The window 27 provides a direction of polarization as indicated by the arrow 28 which direction is substantially at right angles to the direction of polarization of the surface 23 for the mirror 22.

The mirror of 23 may also be used for cosmetic purposes and in this respect, since it is of more conventional shape for a cosmetic mirror, it will be evident that known cosmetic mirrors may readily be adapted by simply providing the necessary polarized surfaces for the mirror and for the window from which the light passes. On the other hand, these rectangular configurations do not permit any adjustment between the directions of polarization.

Referring now to FIG. 4 there is shown a hand manipulable mirror which might for example constitute a dentist's mirror. This structure includes a small flat circular mirror 29 having a polarized surface 30 surrounded by an annular window 31 polarized in a direction different from the polarization of the mirror surface. A light source means in the form of fiber optics 32 has first ends terminating at the underside of the annular window 31 and its other ends terminating in a casing 33 incorporating a light source such as a bulb 34. The casing 33 may constitute part of a handle 35 for the mirror.

As best shown in FIG. 5, the annular window 31 is of washer shape and mounted relative to the mirror 29 such that it may be rotated so that the relative directions of polarization may be adjusted. The rotation of the window is indicated by the arrow A2 in FIG. 4.

OPERATION

In operation of any one of the various embodiments illustrated in the drawings, an object or subject viewed in the mirror will have a different appearance from that were the mirror not provided with a polarized surface. This difference is a consequence of the fact that light eminating from any subject is always partially polarized assuming it is reflected light from any ambient light source. Thus with the mirror itself having a polarized surface and without any special polarized illuminating light, there will be a benefit realized by the use of such a mirror.

When the polarized mirror is used in conjunction with a polarized illuminating light source which light source impinges upon the subject to be viewed in the mirror, more careful control of the subject being viewed is possible particularly in the embodiments wherein the relative directions of polarization can be changed. It is well known that should the directions of polarization be at right angles to each other, the light will be substantially attenuated whereas when the directions of polarization are parallel to each other less attenuation will occur.

By the use of fiber optics as described in FIGS. 4 and 5, the invention is readily adaptable to small mirrors utilized in dental surgery or in other operations wherein a hand manipulable type mirror is required. In this latter respect, the invention is particularly useful since tissue and the like normally exhibits glary highlights as a consequence of the presence of moisture.

From the foregoing description, it will be evident that the present invention has provided new and useful devices incorporating the principles of polarization of light.

What is claimed is:

1. A viewing mirror structure including, in combination: a mirror having a surface polarized in a first direction; a light source means; means mounting said light source means to said mirror for emitting light in a direction to illuminate a subject in front of said mirror; and a polarized window in front of said light source means oreinted to polarize the light illuminating said subject in a second direction different from said first direction.

2. The structure of claim 1, in which said means mounting said light source means to said mirror includes means for changing the relative orientation of said window and surface whereby the angle between the first and second directions of polarization may be adjusted.

3. The structure of claim 2, in which said mirror is circular, said light source means being of annular configurations surrounding the periphery of said mirror, and said window being annular and lying substantially in the plane of said mirror.

4. The structure of claim 3, in which said light source means comprises the ends of a fiber optics array defining an annular configuration at the emitting ends of said fiber optics; and a light source at the other ends of said fiber optics.

5. The structure of claim 4, in which said means mounting said light source means to said mirror includes an elongated handle, a portion of said handle receiving said other ends of said fiber optics and housing said light source whereby a manually manipulable mirror structure results.

* * * * *